United States Patent

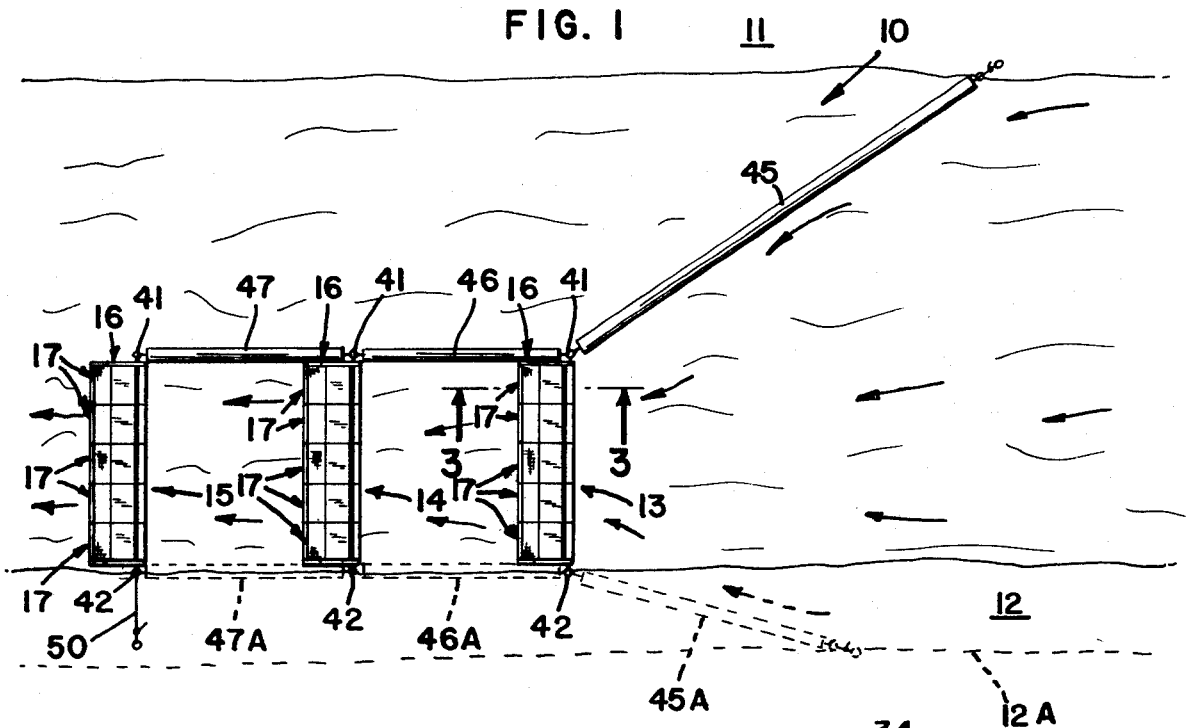
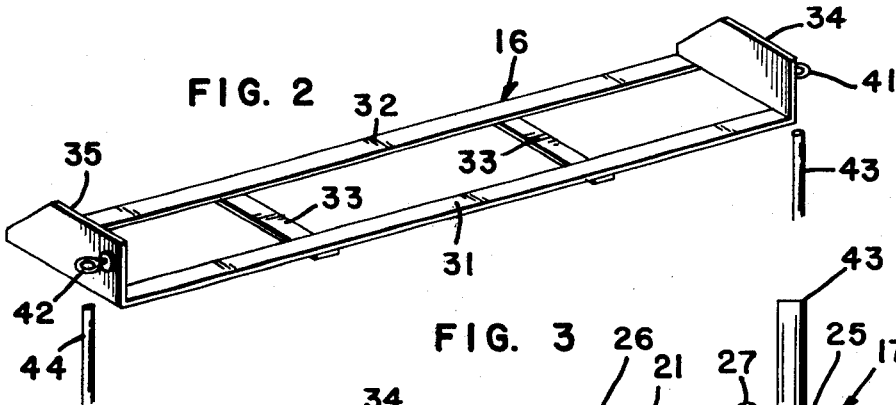
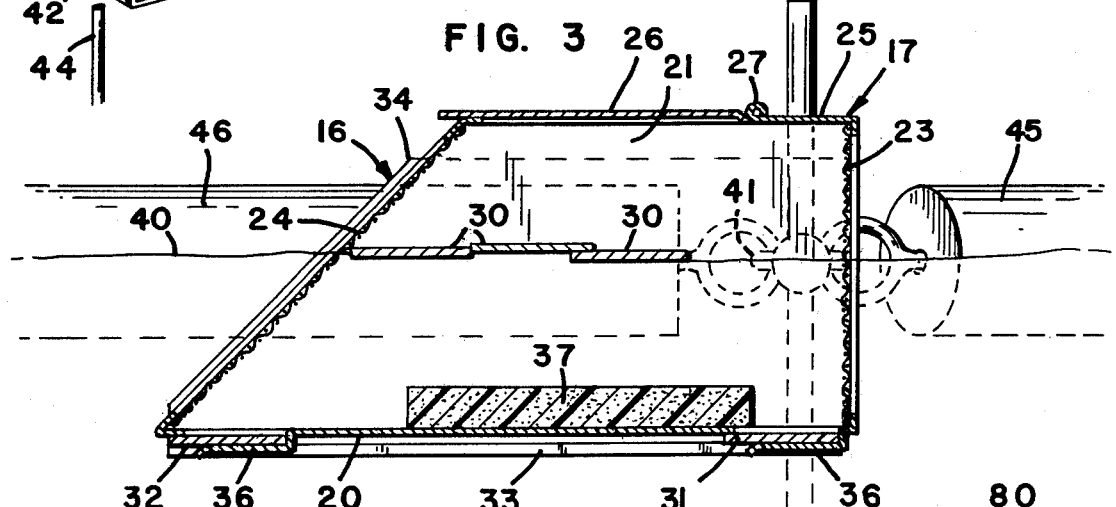
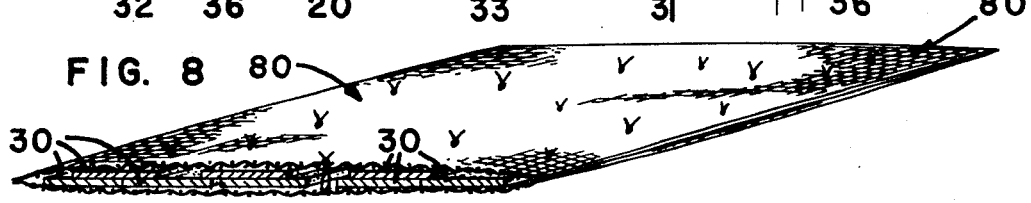

Black

[11] 4,130,489
[45] Dec. 19, 1978

[54] APPARATUS FOR REMOVING RAINBOWS FROM FLOWING WATER

[76] Inventor: Gerall A. Black, 7532 Oakland Ave. South, Minneapolis, Minn. 55423

[21] Appl. No.: 836,601

[22] Filed: Sep. 26, 1977

Related U.S. Application Data

[63] Continuation-in-part of Ser. No. 566,386, Apr. 9, 1975, abandoned.

[51] Int. Cl.$^2$ .............................................. E02B 15/04
[52] U.S. Cl. ...................... 210/242 AS; 210/DIG. 26; 210/500 R
[58] Field of Search ........... 210/40, 84, 242, DIG. 26, 210/335, 336, 521, 522, 39, 41, 73, 500

[56] References Cited

U.S. PATENT DOCUMENTS

| | | | |
|---|---|---|---|
| 801,679 | 10/1905 | Niclausse | 210/521 |
| 1,536,911 | 5/1925 | Nujent | 210/521 |
| 3,693,796 | 9/1972 | Michel | 210/84 |
| 3,702,657 | 11/1972 | Cunningham et al. | 210/242 |
| 3,744,257 | 7/1973 | Spanner | 210/242 |
| 3,752,318 | 8/1973 | DeRouen et al. | 210/522 |
| 3,770,626 | 11/1973 | Ayers | 210/242 |
| 3,779,382 | 12/1973 | Steltner | 210/83 |
| 3,868,319 | 2/1975 | Black et al. | 210/40 |
| 3,904,528 | 6/1973 | Yocum | 210/DIG. 26 |
| 3,928,205 | 12/1975 | Seymour et al. | 210/242 |

*Primary Examiner*—Theodore A. Granger
*Attorney, Agent, or Firm*—Merchant, Gould, Smith, Edell, Welter & Schmidt

[57] ABSTRACT

Apparatus for removing from the surface of water oil contamination particularly in the form of very thin films known as "rainbows". It comprises a plurality of purifying stages each containing a plurality of small independent free-floating pads of buoyant material preferentially absorptive of oil in the presence of water, and means directing the contaminated water to pass through the purifying stages in succession. Two embodiments are shown, one adapted for use to purify the surfaces of bodies of running water such as streams or canals, and one for use in purifying effluents such as bilge water of vessels being pumped from them.

2 Claims, 8 Drawing Figures

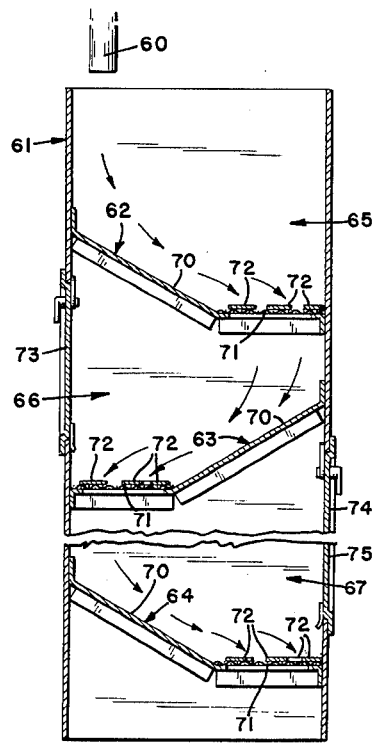

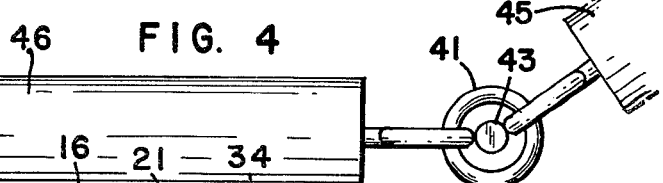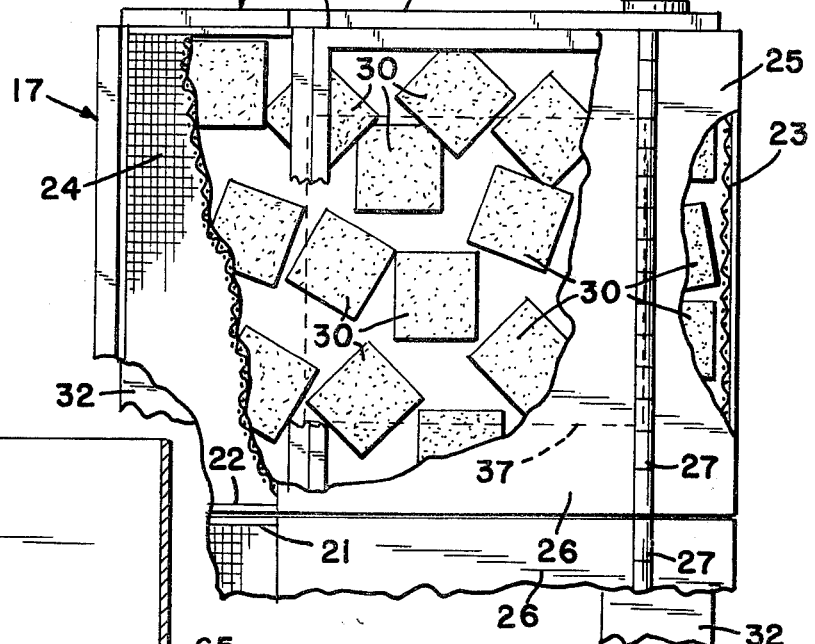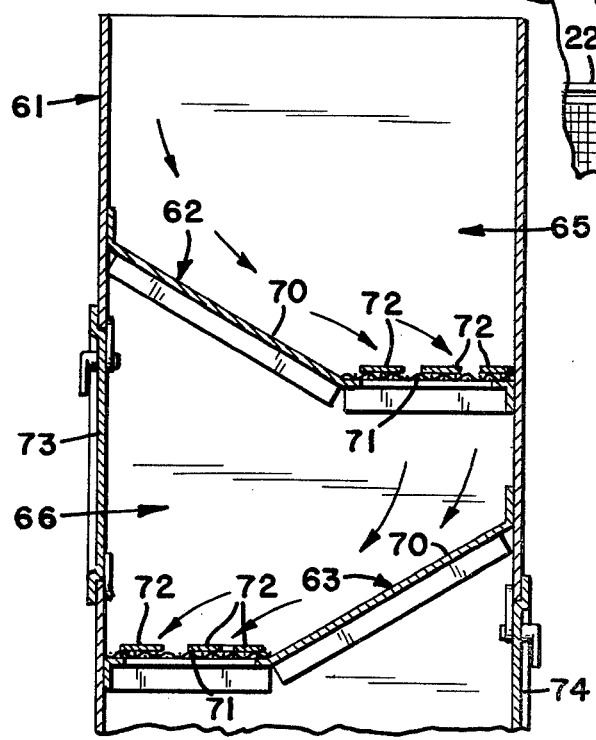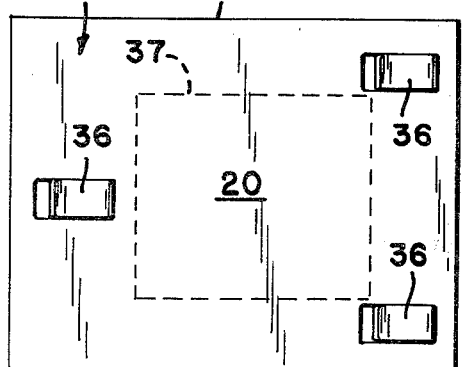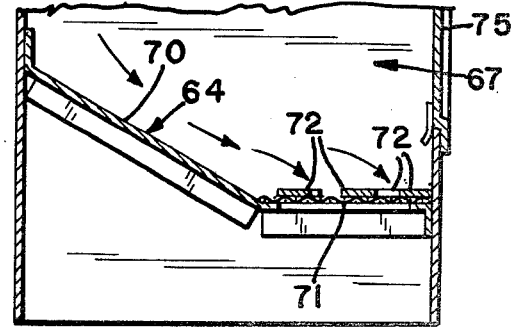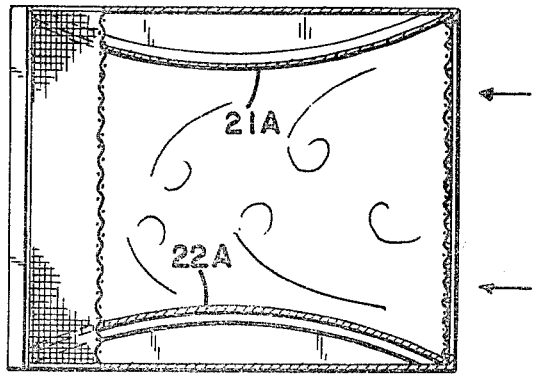

4,130,489

APPARATUS FOR REMOVING RAINBOWS FROM FLOWING WATER

This is a continuation-in-part of application Ser. No. 566,386, filed Apr. 9, 1975, entitled METHOD OF REMOVING RAINBOWS FROM FLOWING WATER, now abandoned.

BACKGROUND OF THE INVENTION

This invention relates to the field of water purification, and particularly to the removal of surface contamination, especially in the form of oil in thin films known as "rainbows", from moving bodies of water, the movement being either natural, as in streams and canals, or artificial, as induced by pumping for example.

It is notoriously well known that oil spills occur and are not only expensive in the loss of the oil but many times as expensive in the cost of clean up operations. It is also well known that a little oil as a contaminant goes a long way in covering the surface of water, and that the resulting thin film spreads rapidly and is difficult to remove. The injurious effects of oil spills on the ecology of the environment are currently well popularized.

There has been much activity in the field of containing oil spills and removing the contaminating oil. In general many methods and arrangements for removing oil are successful when the quantity of oil present is relatively large, but they fail when the quantity of oil is so small as to comprise no more than an extremely thin surface layer detectable principally by its optical properties which produce the familiar "rainbow" surface on otherwise clear water. The word "rainbows" will be used herein to refer to layers of oil of this slight thickness, which incidentally always remain even after the other known methods and arrangements have been practiced to completion.

The invention constitutes a carrying forward of and an improvement in the invention disclosed in my copending application jointly with Edward C. Straub, Ser. No. 408,860, filed Oct. 22, 1973 (now U.S. Pat. No. 3,868,319), and comprises apparatus for extending the principles there taught to the general field of environmental protection.

It makes use of a known material which has the property of being preferentially absorptive of oil in the presence of water, on which the material floats. This material is fully described in U.S. Pat. No. 3,630,891, which also teaches using the material in the form of a blanket to be deposited on contaminated surfaces and allowed to absorb the contaminant.

My copending application referred to above teaches the use of the material not in blanket but in small pads or scraps, positioned and retained in the recirculation path of water for swimming or other artificial pools. In this limited application the material functions admirably, and the method has found ready commercial acceptance.

SUMMARY OF THE INVENTION

The present invention comprises improved apparatus for removing oil as a thin film of surface contamination from large bodies of water which are not capable of recirculation, such as natural streams, canals, and effluent discharges, by directing at least the upper stratum of the water to pass through a channel having a plurality of purifying stages each comprising at least one floating chamber containing a plurality of small independent free-floating pads of the material preferentially absorptive of oil from water, the numer of such pads in each chamber being limited so that they are free to move about in the chamber and with respect to each other and so that the edges of the pads are in contact with the interface between the oil and the water. The apparatus may include means for introducing turbulence into the flow of the liquid.

Various advantages and features of novelty which characterize my invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there are illustrated and described certain preferred embodiments of the invention.

BRIEF DESCRIPTION OF THE DRAWING

In the drawing, FIG. 1 shows my invention applied to the purification of a natural stream;

FIG. 2 shows a frame used in the structure of FIG. 1;

FIG. 3 is a section taken along the line 3—3 of FIG. 1;

FIG. 4 is a fragmentary plan view of a portion of FIG. 1, parts being broken away for clarity of illustration;

FIG. 5 is a bottom view of an element of FIG. 1;

FIG. 6 is a sectional plan view of a modified element;

FIG. 7 shows the method applied to purify the effluent from the bilge pump of a vessel; and FIG. 8 is a partially sectional view of a component used in practicing the invention.

DESCRIPTION OF THE PREFERRED EMBODIMENT

Turning now to the drawing, FIG. 1 shows my invention as applied to the purification of a natural stream having surface contamination of oil. This stream 10 flows in the direction of the arrows between banks 11 and 12. Three purifying stages are shown at 13, 14, and 15; each stage comprises a supporting frame 16, better shown in FIG. 2, to which are affixed a number of flow-permissive chambers 17 shown in more detail in FIGS. 3-5.

Chambers 17 can conveniently be made of sheet metal. Each chamber comprises a generally solid bottom 20, solid sides 21 and 22, upstream and downstream walls 23 and 24 of screen material, and a solid top 25 including a door 26, hinged at 27, through which a supply of pads 30 of preferentially oil absorptive material may be introduced.

As pointed out in my copending application referred to above, the size of the individual pads 30 is such that their total perimeter is large as compared with the perimeter of a single pad having their total area. For example, 16 square pads two inches on a side have a total area of 64 square inches, but their total perimeter of 128 inches is much larger than the 32 inch perimeter of a single square pad of the same area.

Another factor to be considered is that the chamber should not be packed full of pads. Their number should be such that they are free to move with respect to each other and to the chamber walls, so that their edges are generally in contact with the oil-water interface. Turbulence and currents in the chamber may cause temporary engagement between the pads, as suggested in FIG. 3, but these patterns change, in a continuously varying relationship, with eddies and wavelets in the flowing water. If desired the paths may be of circular configuration, to minimize edge-to-edge contact therebetween. The total area of the pads should preferably not be greater than 50% of the area of chamber 17 at level 40.

Frame 16 includes front and rear stringers 31 and 32, cross members 33, and end members 34 and 35. Chambers 17 may be secured to the stringers of 16 by clips 36 struck out of the bottoms of the chambers or by other appropriate means, and may be fastened together laterally if desired by any suitable means not shown.

Stages 13, 14 and 15 must be supported in the water so that pads 30 float on its surface. A fixed structure is satisfactory where the water level does not change, but for most natural streams the stages must be arranged to float partially submerged. Any conventional means for accomplishing this may be used; in the drawing, I show a floatation member 37 secured to the bottom 20 of each chamber. The buoyancy of these members jointly is sufficient to support the chambers and frame 16 so that the water line is at 40 in FIG. 3.

Means conventional to those familiar with the construction of docks and floats may be used to secure the stages in place in the stream. In an attempt at generality, I have shown in FIG. 1 that bank 12 is essentially vertical, while bank 11 is a natural slope. Each frame 16 has large eyes 41 and 42 at its ends. As shown, a stake 43 is driven into the bed of the stream, and a comparable rod 44 extends vertically along the wall of bank 12. Then as the water line rises and falls, the eyes 41 and 42 slide on stake 43 and rod 44 as frame 16 is buoyed up by floatation members 37.

A floating boom 45 is shown extending from eye 41 to the opposite bank 11 of the stream, and accomplishes two functions. In the first place it supports stake 43 against the lateral force of the stream acting on stage 13. In the second place it directs the surface stratum of the stream towards stage 12, so that a stage of limited length receives substantially all the surface contamination of the stream for absorption by pads 30.

Similar floating booms 46 and 57 connect the offshore ends of the stages, and further stakes in the river bed and rods in the wall may be supplied as necessary.

I have shown in dotted lines in FIG. 1, as an alternative arrangement, that bank 12A of the stream may also slope. In this case duplicate booms 45A, 46A, and 47A may be provided to direct the flow of the surface stratum and maintain the position of the purifying stages. Additional stakes in the river bottom may be used if desired, or strategically located anchors may be found helpful, as suggested at 50.

In general the stream flow through screen wall 23 gives sufficient turbulence to insure that pads 30 are able to break the surface tension of the contaminant film and absorb it. FIG. 6 shows a modified chamber in which the side walls 21A, 22A are reentrant to give a venturi flume effect, thus fluid-dynamically increasing the turbulence of the flow where this is desired.

The use of these embodiments of my invention is selfexplanatory: there need only be mentioned that pads 30 must be replaced, through doors 26, as they become saturated with contaminent.

FIG. 7 shows my invention applied to an effluent containing oil as a contaminent. The effluent is supplied through a conduit at 60, and passes by gravity down a column 61 crossed by partitions 62, 63 and 64 to produce purifying stages 65, 66 and 67. Each partition comprises a downward and inwardly sloping baffle 70 and a horizontal screen bottom 71 upon which rest pads 72 of a preferentially absorptive material. Suitable doors or portholes 73, 74 and 75 are provided to permit insertion and replacement of the absorptive pads. The partitions are alternated in arrangement so that in each stage the liquid first falls on the baffle and then flows to the screen bottom where it contacts the pads.

It will be evident that for highly contaminated liquid such as bilge water from a ship, the number of stages may need to be increased beyond 3, and the frequency of replacing the pads, particularly at the top of the column, may also be increased.

FIG. 8 shows that the pads and scraps of preferentially absorptive material may be supplied in thin net sacks identified by the reference numeral 80, if this appears convenient.

Numerous characteristics and advantages of my invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

What is claimed is:

1. Apparatus for removing oil from moving water, comprising, in combination:

first and second purifier stages comprising chambers containing free floating pads of buoyant material preferentially absorptive of oil in the presence of water, each said chamber having a bottom comprising a downwardly and inwardly sloping solid baffle portion and an abutting horizontal perforated portion supporting the buoyant material;

means admitting liquid to be treated to fall on said baffle portion of said first stage;

and means mounting the second chamber below and vertically spaced from first chamber so that liquid flowing from the perforated bottom portion of the bottom of said first chamber impinges upon the baffle portion of said second chamber.

2. Apparatus for removing a thin film of oil from the surface of a body of flowing water comprising, in combination:

(a) at least one purifying stage comprising a chamber and float means for buoyantly supporting said chamber at the surface of a body of water with the bottom of said chamber beneath the surface and the top of said chamber above the surface, said chamber consisting of spaced apart perforated end walls for the flow of liquid therethrough and imperforate sidewalls connecting said end walls, said sidewalls being constructed and arranged to define a venturi flume channel within said chamber between said perforate end walls, and (b) free floating pads of buoyant material preferentially absorptive of oil located within said chamber so that said venturi channel increases the turbulence of liquid flowing through said chamber and assists in the preferential absorption of oil by said free floating pads.

* * * * *